(Specimens.)
J. GARDNER & J. F. HARRIS.
PROCESS OF REFINING HYDROCARBON OILS.
No. 442,802. Patented Dec. 16, 1890.
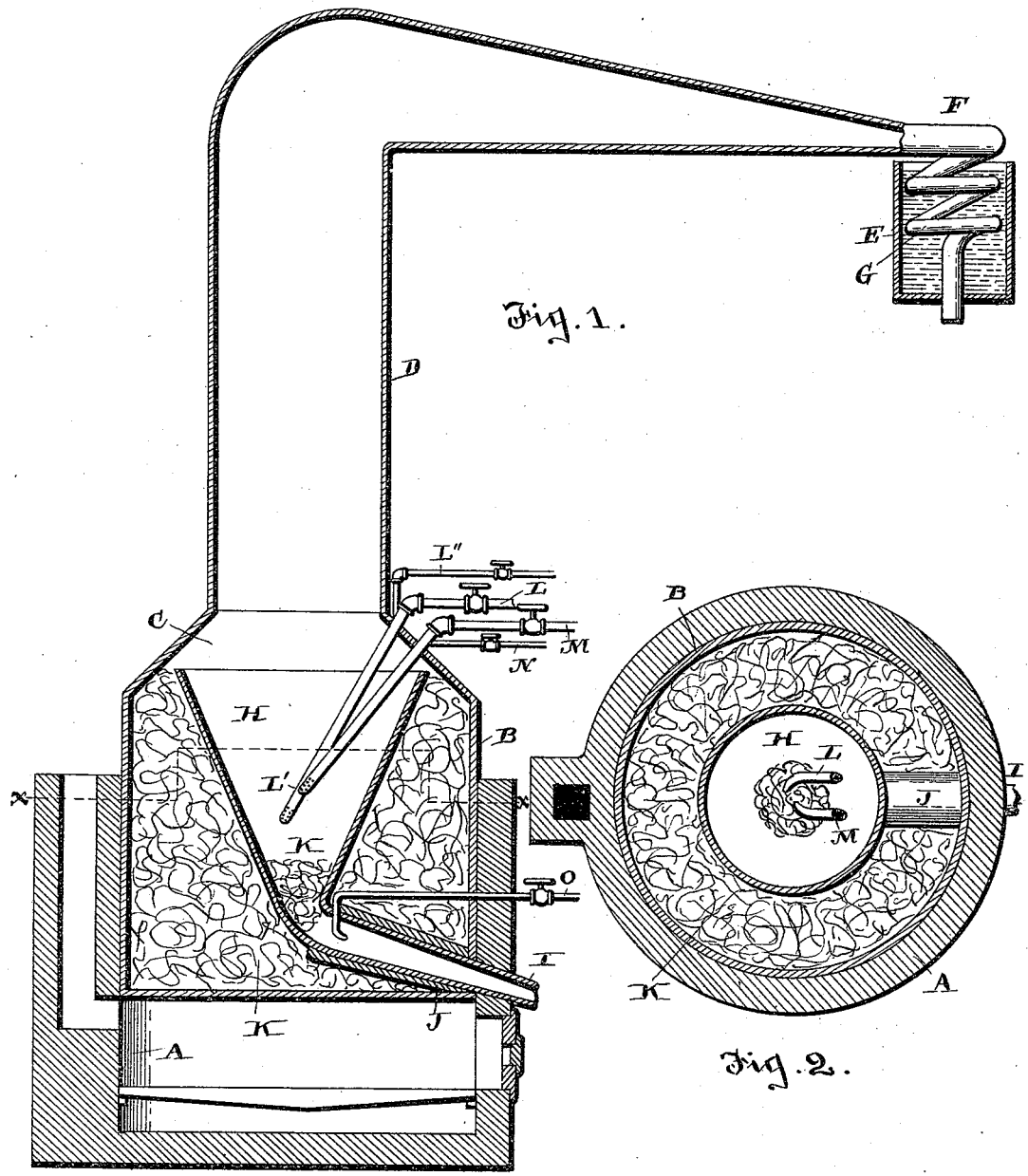

UNITED STATES PATENT OFFICE.

JOHN GARDNER AND JAMES F. HARRIS, OF TOLEDO, OHIO.

PROCESS OF REFINING HYDROCARBON OILS.

SPECIFICATION forming part of Letters Patent No. 442,802, dated December 16, 1890.

Application filed December 10, 1889. Serial No. 333,293. (Specimens.)

*To all whom it may concern:*

Be it known that we, JOHN GARDNER and JAMES F. HARRIS, citizens of the United States, residing at Toledo, in the county of Lucas and State of Ohio, have invented certain new and useful Improvements in a Process of Refining Hydrocarbon Oils; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to a process of refining hydrocarbon oils, and has for its object to thoroughly vaporize the same and commingle a metallic oxide therewith, by which means to desulphurize the oil and eliminate the refractory substances therefrom, thereby producing a practically uniform grade of fine petroleum suitable for illuminating purposes.

A further object is to provide for a continuous process of distillation with means for condensing the distillate or distillates should the product vary in specific gravity.

The invention relates to the parts and combination of parts hereinafter fully described, and pointed out in the claims.

The accompanying drawings represent what we consider the best means of carrying out our process, in which—

Figure 1 is a longitudinal vertical sectional view of what may be properly called a "converter," inasmuch as the oil to be refined is injected therein and passes therefrom in a condition to be separated from the impurities as a refined oil. Fig. 2 is a plan view of the same, taken on the line $x\ x$ of Fig. 1.

In carrying out our process we construct a furnace A, of metal, brick, stone, or any preferred material, into the top of which is set the converter, preferably consisting of a cylindrical vessel having an enlarged vaporizing-chamber B, a contracted portion C, and a conduit D for the combined vapors, which leads into a condensing-chamber E, from which the distillates are led to any preferred form of settling tank or receptacle, in which the precipitation of the baser properties takes place and from which the refined product is drawn.

It will be apparent that we may provide a series of condensing-chambers and lead the distillate in its varying gravities to separate tanks, and in fact this is ordinarily desirable, as the purer distillates should be condensed and led to a tank in which the product is a uniform grade of refined petroleum, with a tank into which is led the distillates (should such be present) having a density too great for illuminating purposes, this provision being made by continuing the contracted pipe end F of the converter to allow of any desired number of condensing-coils G to be connected therewith.

Within the vaporizing-chamber B is inserted a conical vessel H, having an outlet-pipe I leading without the furnace, the pipe I being at an angle to the vaporizing-chamber and inclosed with a casing J to prevent a degree of heat therein sufficient to bake or coke the paraffine wax or baser products to be conducted therethrough, the pipe I also being designed to supply atmospheric air to the vaporizing-chamber.

K designates a packing of metal, preferably of rusted fibrous iron, which entirely surrounds the vaporizer, there being a quantity of the same substance within the contracted throat of the vaporizing-chamber at the point where the pipe I turns at an angle thereto.

L designates a pipe leading to a supply of liquid, preferably water, in which is mixed a quantity of iron-rust mechanically suspended therein, which pipe is formed with an injector-nozzle L', perforated to spray the liquid into the vaporizer, the liquid being injected therein with great force, caused by the pressure of steam led into pipe L by a pipe L'', leading from a steam-supply, and by its force tending to siphon the liquid through pipe L.

M designates an oil-supply pipe leading from the oil-reservoir and formed with a perforated end slightly above the end L' of pipe L and adapted to spray the oil into the vaporizer, there being a pipe N connected therewith and with a steam-supply, whereby the oil is not only drawn through the pipe, but forcibly injected into the vaporizing-chamber.

O designates a pipe leading from the steam-supply and into the outlet-pipe I, by which to remove any of the baser deposits from the oil that may gravitate therein.

In operation a fire is built in the furnace A and the vaporizing-chamber is heated to a temperature of from 400° to 600° Fahrenheit, and with some grades of oil in which there is a large percentage of sulphur it may be necessary, in order to release the sulphur compounds, to raise the temperature somewhat higher. When the vaporizing-chamber has become sufficiently heated, the cocks in pipes L and L'' M and N are opened, when the steam will cause the oil and the water carrying the iron oxide to be forcibly sprayed into the vaporizing-chamber, where they will be at once vaporized, and then the oxide that is in the water will be re-enforced by that evolved from the metallic packing K, (which packing must, of course, be removed occasionally,) when, owing to the affinity of the oxide for sulphur, the two will unite, and, together with the hydrocarbon vapors, pass through the conduit D to the condenser, and from thence to the settling-tanks, (not shown,) wherein the sulphur, arsenic, and other impurities are precipitated, by reason of the specific gravity of the same, to allow of drawing off the distillate, consisting of a uniform grade of refined petroleum suitable for illuminating purposes; or if the product should consist of distillates of varying gravities there may be a series of condensing-chambers connected with pipe F, and distillates of different gravities may be led by separate and distinct conduits into settling-tanks to be drawn therefrom.

It will be seen from the above description that the metallic oxide is commingled with the rapidly-evaporating hydrocarbon as it passes into what may properly be called an "intermingling-chamber," as the force of the jet of the oil and liquid from pipes L and M below the contracted portion C of the converter tends to create a gyratory current of sufficient strength to cause the same to travel a circuitous route within the intermingling-chamber to intermingle and heat the same, and the heated current of air caused by the ascending heat from the metallic packing draws the vapors into conduit D by reason of the vacuum caused thereby and at the same time causes a rapid evaporation thereof, by which means an oil of high fire-test is produced practically free from the disagreeable odor, particularly of that class containing sulphur and arsenic.

During the process of distillation just described any of the paraffine or tarry matter that may fail to disintegrate and intimately commingle with the metallic oxide due to the presence of the ferruginated liquid—namely, water—in which is mixed a quantity of iron-rust in the distilled hydrocarbon, passes through the interstices of the packing K of iron within the vaporizing-chamber H into pipe I, which remains open at all times and admits atmospheric air to the vaporizing-chamber, as the vaporization of the oil and water takes place as soon as they strike the sides of the packing K, and as a consequence all but the baser portions pass up through conduit D, while these baser portions and any particles of the oxide pass through the packing and are forced out of pipe I by means of the jet of steam from pipe O.

We have deemed it unnecessary to illustrate the form of tanks into which the combined vapors are discharged, as any tank or receptacle will suffice, so that the sulphur compounds may be precipitated therein and allow of withdrawing the refined oil therefrom.

Having thus fully described our invention and a preferred form of apparatus for carrying out the same, what we claim is—

1. The process of refining oils, which consists in injecting a ferruginated liquid into a vaporizing-chamber, intimately commingling a spray of oil therewith and vaporizing the same, condensing the vapors, and separating the sulphur compounds.

2. The process of refining oils, which consists in vaporizing the oil at a temperature above 400° Fahrenheit, commingling a ferruginated liquid therewith, and uniting with the resulting vapor a heated current of air carrying a metallic oxide.

3. The process of refining oils, which consists in leading a volume of ferruginated liquid into a highly-heated chamber, and injecting a volume of oil above the same and within a heated current of air, whereby the vapor from the liquid is caused to pass through the hydrocarbon vapor.

4. The process of refining oils, which consists in vaporizing the oil within a chamber provided with a conduit for leading the vapor to a condensing-chamber, commingling a metallic oxide within the chamber, and uniting a heated current of air therewith.

In testimony that we claim the foregoing as our own we hereby affix our signatures in presence of two witnesses.

JOHN GARDNER.
JAMES F. HARRIS.

Witnesses:
WILLIAM WEBSTER,
CARROLL J. WEBSTER.